United States Patent Office 3,481,217
Patented Dec. 2, 1969

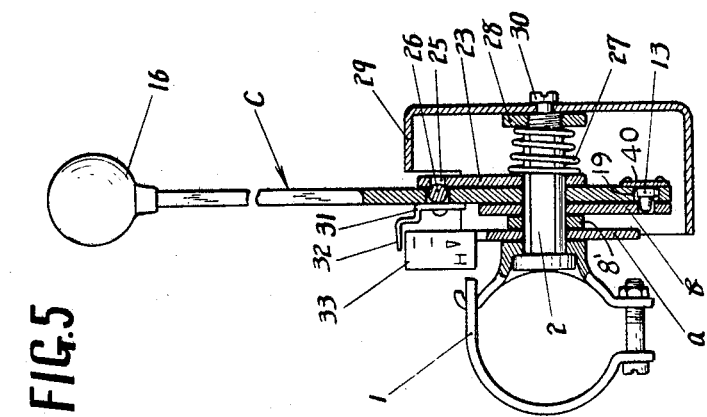
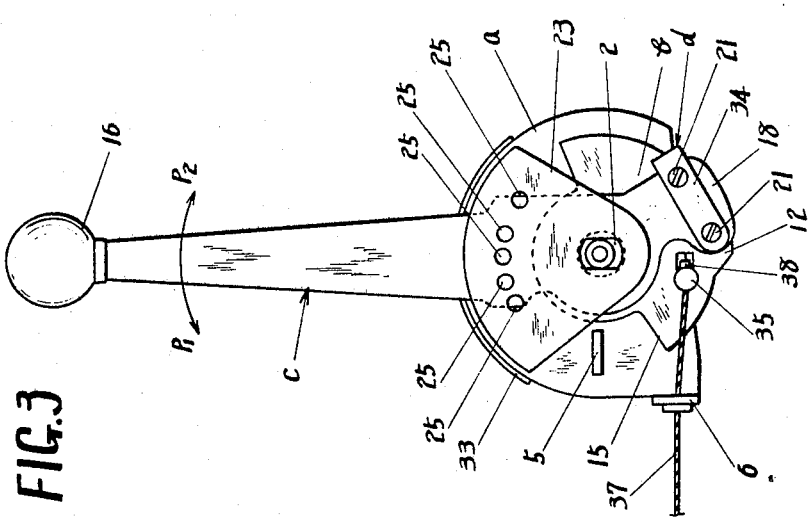
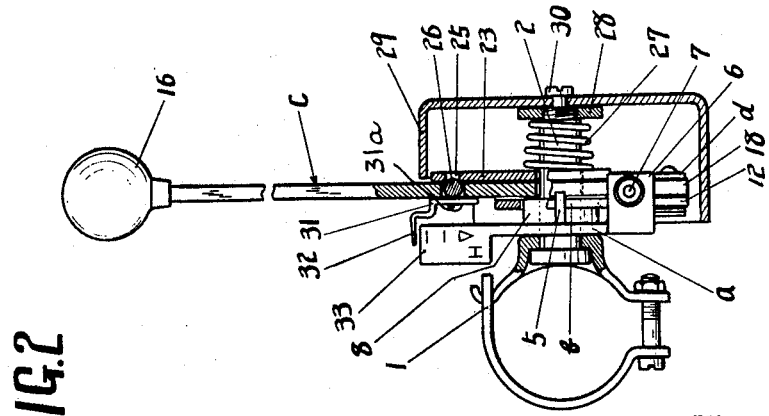

3,481,217
GEAR SHIFT LEVER
Tetsuo Maeda, 1/12 1-chome, Hamadera-koen-machi,
Sakai, Osaka, Japan
Filed Jan. 9, 1968, Ser. No. 696,612
Claims priority, application Japan, Dec. 15, 1967,
42/80,818
Int. Cl. G05g *11/00, 5/10*
U.S. Cl. 74—489                 3 Claims

ABSTRACT OF THE DISCLOSURE

A device of a speed change gear of a bicycle comprising an operating lever including a handle portion and a base, the latter being axially mounted for rotation. A wire fixing plate is pivotally disposed on one side of the base and mounted for joint rotation parallel to the operating lever. A spring is provided and adapted to cause a tapered combination pin to be held jointly between the base of the operating lever and the wire fixing plate in a pin hole formed in either the wire fixing plate or the operating lever for joint movement of the lever and the fixing plate when shifting from one to another chain gear.

---

The present invention relates to a bicycle gear shift lever apparatus, in general, and to a bicycle gear shift lever apparatus by which the chain, which is driven by pedaling the bicycle, can be switched to other chain gears having different diameters so as to change the speed of the bicycle, in particular.

In conventional bicycles, the speed change gear and the operative gear shift lever apparatus are connected by a wire and, during the rotation of the chain, the speed change gear can be operated, if the shift lever in the apparatus is pulled, and the chain is then forced so as to switch to other chain gears of different diameters. But, when the chain is not running, whether the bicycle has been stopped or is running, the chain cannot be switched, even if the shift lever is operated. Consequently, if the shift lever is unnecessarily and unreasonably operated, the wire will become stretched and loose, and the shift lever will become distorted, or the parts of the speed change gear may become bent.

It is an object of the present invention to eliminate the above-mentioned disadvantages and to provide a safe gear shift lever apparatus which is free from apprehension, so that neither the speed change gear, nor the gear shift lever apparatus will get out of order, even if they are operated by a novice.

With the above and other objects in view which will become apparent in the following detailed description, the present invention will be clearly understood in connection with the accompanying drawings, in which:

FIG. 2 is a partial axial view of the apparatus of FIG. 1 in the assembled condition partly broken away;

FIG. 3 is a front view of the apparatus of FIG. 2 with the case removed;

FIG. 4 is a sectional view showing the relation between the lower end of the operating lever, the wire connecting plate and the wire; and FIG. 5 is a partial axial sectional view, partly broken away, of another embodiment of the present invention.

Figure 1:
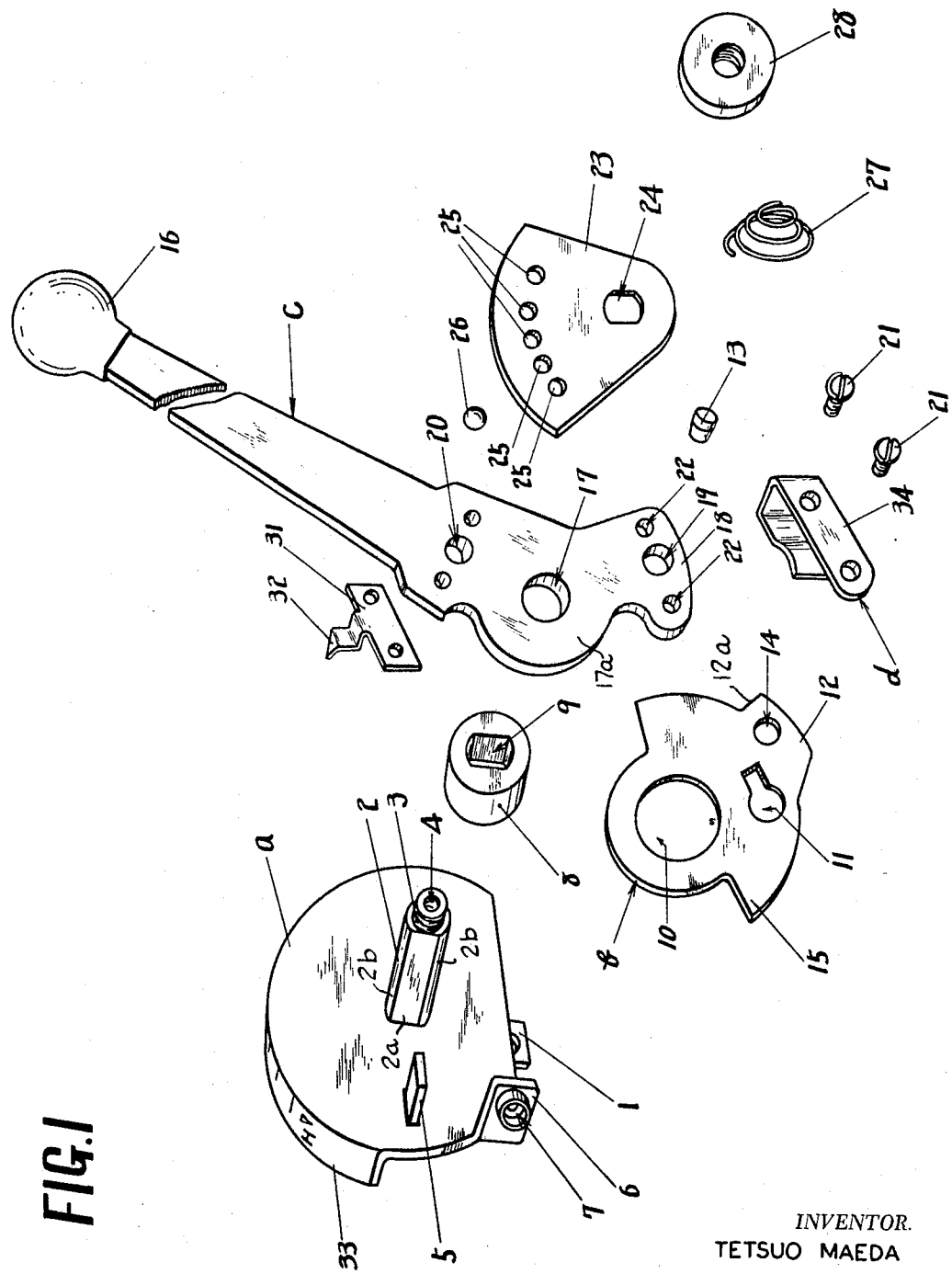
FIGURE 1 is an exploded perspective view of the main component parts of the gear shift lever apparatus according to the present invention.

Referring now to the drawings, and more particularly to FIGS. 1–4, the gear shift lever apparatus of the present invention comprises a fixed base plate *a* which is adapted to be affixed by a binding fixture 1 disposed on its rear side to a bicycle frame or handle. An axle 2 extends forwardly from substantially the center of the front side of the base plate *a*. The axle 2 is substantially oval in cross-section, forming two substantially flat opposite parallel sides 2*a*, although not limited thereto, and two opposite arc surfaces 2*b* of a circle. The free end of the axle 2 has a threaded peripheral part 3 of a diameter slightly smaller than the oval shaped portion of the axle 2 and a threaded hole 4 is centrally formed at the extreme free end thereof. An abutment stop 5 projects rigidly from the front side of the fixed base plate *a* laterally relative the axle 2. At one side of the lower portion of the base plate *a*, a lug 6 projects frontwards, having a hole 7 therethrough, through which a gear shift wire 37, (FIG. 3) extends for the speed change gear. A thick cylindrical washer 8 formed with a hole 9 having a cross-section complementary to that of the oval portion of the axle 2 is inserted on the oval portion of the axle 2 abutting the plate *a*. A rotatable wire connecting plate *b* having an opening 10 complementary to the cylindrical periphery of the washer 8 is inserted freely thereon for rotatable movement relative thereto. The plate *b* is formed with a key shaped opening 11 by which the gear shift wire 37 is operatively connected to the plate *b*, as illustrated in FIGS. 3 and 4 and hereinafter described.

The wire connecting plate *b* includes a lug 12 at the lower end thereof, through which a pin hole 14 is formed, and on one side an abutment surface 15 is formed which operatively abuts the abutment stop 5 when the plate *b* is rotated sufficiently clockwise. An operating lever *c* is provided with a handle grip part 16 and an integral rotatable base plate 17*a* formed with a circular axle hole 17 substantially of the same curvature as the arc surfaces 2*b* of the axle 2. The lever *c* is freely, rotatably inserted through hole 17 on the oval portion of the axle 2 abutting the end of the washer 8 (FIG. 2). At the lower end of the operating lever *c*, a lug 18 is arranged, through which a hole 19 is formed.

A joining pin 13 is jointly inserted in the hole 19 and the hole 14 of the plate *b* which holes 19 and 14 are aligned for this purpose, the plate *b* being positioned on the end of the washer 8 contacting the base and lug 18 of the operating lever *c* and maintained in this position by means of a leaf spring *d* bent into a U-shape and attached at end 34 to the lug 18 of the operating lever *c* by two set-screws 21 passing into holes 22 in the lug 18, thereby holding the lug 12 of plate *b* and the lug 18 of lever *c* therebetween. A ball receiving hole 20 is formed in the base of the lever *c* above the hole 17, for receiving a small metal ball 26 hereinafter more fully described. The tip of the pin 13 slightly tapers and is inserted into the hole 14 of the plate *b* to which the gear shift wire is attached. The plate *b* is urged toward the operating lever *c* by the leaf spring *d*, and the joining pin 13 is securely held by the U-shaped leaf spring *d*, so that it can never fall out of hole 19 in the lug 18 of the operating lever *c*.

A supplementary non-rotatable or stationary plate 23 is provided which is formed in the central part of its lower end with an oval hole 24 complementary to the oval portion of the axle 2, on which it is inserted adjacent the operating lever *c*. At the upper portion of plate 23, at positions separated a radial distance from the center of the hole 24, equal to the distance of ball receiving hole 20 from the center of the axle hole 17 of the operating lever *c*, there are provided a plurality of small holes 25. The small metal ball 26 is inserted in the hole 20 of the operation lever *c* and is backed up, thereby preventing the ball 26 from falling out of the hole 20, by an abutment member 31 secured by screws 31*a* (FIG. 2) to the operating lever adjacent the hole 20. The ball 26 is sized so that a part of the ball projects out of the hole 20 toward the adjacent surface of the plate 23 and cooperatively enters into one of the small holes 25 in the stationary plate 23 for locking the operating lever in selected position. A coil compression spring 27 urges the plate 23 toward the operating lever $c$ causing the ball 26 to be maintained lockingly in one of the holes 25 in the plate 23. The spring 27 is positioned on the axle 2 between the plate 23 and a bearing 28 screwed on the threaded peripheral part 3 at the free end of the axle 2.

A cover 29 for the above-mentioned parts is fixed by screw 30, which is scewed into the threaded hole 4 at the tip of the axle 2. The abutment member 31 is preferably made of metal and is arranged on the back of the operating lever $c$ to prevent the small ball 26 from falling out of the hole 20. The upper end of the member 31 is bent into a pointer 32 lying along an upper cylindrical brim 33 of the base plate $a$, the brim being marked with graduations so that the pointer 32 of the member 31 which jointly moves with the lever $c$ can indicate the rotational position of the operating lever.

The above described operating gear shift apparatus is affixed to any required position of the bicycle by the binding fixture 1, while the operative gear shift wire 37, originating from the speed change gear (not shown) extends through the hole 7 in the lug 6 and is connected to the plate $b$ at its tip which is fixed via pin 35 in the opening 11. As shown in FIG. 4, the gear shift wire 37 may be fixed to the plate $b$ by inserting the pin 35 into hole 11. A hole 36 is provided at the tip of the pin 35 through which the wire 37 passes. The tip of the wire 37 is provided with a metal fitting 38 larger than the diameter of the hole 36 in order to prevent the wire 37 from being removed from the pin 35.

In normal operation, if one pivots the operating lever $c$ about the axle 2, by means of the handle grip part 16, in the direction of the arrow shown in FIG. 3, the wire fixing plate $b$, which is connected to the gear shift wire 37, pivots jointly with the lever $c$ due to the joining pin 13 connecting the plate $b$ with the lever $c$. Accordingly the plate $b$ pivots about the periphery of the washer 8 together with the pivoting of the operating lever $c$. If the operating lever $c$ is moved in the direction of the arrow $P_1$, the gear-shift wire 37 is tightened and drawn near. When the lever is moved in the direction of arrow $P_2$, the wire 37 is loosened. Since the stationary plate 23 is pressed against the operating lever $c$ by spring 27, the operating lever $c$ will remain locked by the ball 26 in one of the holes 25, in the position to which it was pivoted. The operating lever $c$ can be pivoted to the position where the small ball 26 in the hole 20 of the lever coincides with a selected hole 25 of the plate 23. The above is the operation of the apparatus of the present invention during normal operating conditions.

On the other hand, when the gear chain cannot switch, as in the case when the bicycle is stopped and if the lever $c$ is forcibly operated (e.g., $P_1$) by mistake, the lever $c$ is forced to pivot, but the hole 14 in the plate $b$ slides along the taper of the joining pin 13 toward the tip of the pin 13. Therefore, against the resistance of the spring $d$, the plate $b$ separates from the operation lever $c$, the hole 14 coming off the joining pin 13. As a result the operating lever $c$ and the plate $b$ are disconnected from joint pivotal movement and a forcing movement of the operating lever $c$ does not strain the parts, such as wire 37, the plate $b$, or the lever $c$.

That is, the plate $b$ is arranged to pivot parallel to the operating lever $c$, on one side of the lever $c$ and, with the aid of the spring $d$, the plate $b$ is urged toward the operating lever $c$, while the pin hole 14 may be arranged in either one of the plate $b$ or the operating lever $c$ and the tapered joining pin 13 projects thereon, so that the tip of the pin 13 is inserted into the pin hole 14, and held therein. The gear shift lever device according to the present invention can be actuated by a lever in the same manner as the conventional apparatus and, even if operated by the novice, the wire 37 will never be stretched and loosen, nor will there be apprehension that the speed change gear will fail.

The plate $b$ and the operating lever $c$ can automatically resume their joined pivoting connection when required. The abutment surface 15 on the plate $b$ contacts the abutment stop 5 on the base plate $a$ when plate $b$ is pivoted clockwise, in the direction to loosen the wire, by pivoting the lever $c$ clockwise, whereupon the movement of the plate $b$ stopped.

That is, if the operating lever $c$ is pivoted in the clockwise direction of the arrow $P_2$, in FIG. 3, at a time when the plate $b$ is disconnected from the operating lever $c$, the plate $b$ is pushed clockwise by the tip of the joining pin 13 against lug edge 12$a$ substantially perpendicular to the direction of rotation of plate $b$, until the abutment surface of lug 15 contacts the abutment stop 5. After contact, the lug 18 of the operating lever $c$ moves laterally adjacent the lug 12 of the plate $b$ and when the holes 14 and 19 align, the joining pin 13 once again becomes inserted into the hole 14 of the plate $b$ to be held therein. Accordingly the joint connection between the plate $b$ and the operating lever $c$ can be easily resumed merely by turning the operating lever $c$ into its original position.

Referring now again to the drawings, and more particularly to FIG. 5, another embodiment of the invention is disclosed. Here the spring 27, serves to cause the plate $b$ and the operating lever $c$ to press toward and be held to each other, as well as, simultaneously cooperatively pressing the stationary plate 23 against the operating lever $c$. In the previous embodiment these two functions were accomplished by two springs $d$ and 27. An appropriate covering piece 40 is arranged in order to secure and prevent the joining pin 13 from falling out of the hole 19. The plate $b$ is rotatably mounted on the axle 2, and abuts the end of washer 8'.

While I have disclosed several embodiments of the present invention, it is to be understood that these embodiments are given by example only.

What is claimed is:

1. A gear shift lever apparatus for a speed change gear, comprising
   an axle,
   an operating lever including a handle grip and a rotatable base plate, the latter pivotally mounted on said axle for joint rotation with said handle.
   a rotatable wire connecting plate operatively pivotally mounted about said axle next to one side of said rotatable base plate and adapted to engage a gear change wire,
   spring means for urging said rotatable wire connecting plate towards said rotatable base plate,
   said rotatable wire connecting plate and said rotatable base plate constituting releasable cooperative pivoting members,
   one of said releasable cooperative pivoting members having a pin hole therein facing the other of said releasable cooperative pivoting members, and
   a tapered joining pin operatively secured to said other of said releasable cooperative pivoting members and projecting therefrom toward said one of said releasable cooperative pivoting members and engaging releasably in said pin hole for releasably causing said rotatable wire connecting plate to pivot jointly with said rotatable base plate.

2. The apparatus, as set forth in claim 1, wherein said rotatable wire connecting plate is formed with an abutment surface facing in a direction of movement of said rotatable wire connecting plate which would loosen said gear change wire, and
   an abutment stop means immovably operatively fixed relative to said axle for abutting said abutment surface and stopping the pivoting movement of said rotatable wire connecting plate at a predetermined position when the latter is operatively pivoted in said direction of loosening said gear change wire.

3. The apparatus, as set forth in claim 2, wherein said rotatable wire connecting plate is formed with an edge facing opposite said direction, and spaced from the center of said axle by a distance substantially equal to the distance of said joining pin from the center of said axle, said joining pin thereby engaging said edge for pushing said rotatable wire connecting plate into abutment with said abutment stop when said joining pin is released from said pin hole and said operating lever is released from said rotatable wire connecting plate and said operating lever is pivoted back toward said rotatable wire connecting plate.

References Cited

UNITED STATES PATENTS

| | | | |
|---|---|---|---|
| 2,785,586 | 3/1957 | Schwerdhofer | 74—489 |
| 3,176,536 | 4/1965 | Altenberger | 74 489 |

MILTON KAUFMAN, Primary Examiner

U.S. Cl. X.R.

74—535